United States Patent
Lange et al.

(10) Patent No.: US 10,341,880 B2
(45) Date of Patent: Jul. 2, 2019

(54) TELECOMMUNICATION SYSTEMS WITH DISTRIBUTED BASE STATION FUNCTIONALITY

(71) Applicant: Andrew Wireless Systems GmbH, Buchdorf (DE)

(72) Inventors: Keld Knut Lange, Oetisheim (DE); Thomas Kummetz, Kissing (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 1 day.

(21) Appl. No.: 15/737,241

(22) PCT Filed: Jun. 15, 2016

(86) PCT No.: PCT/EP2016/063811
§ 371 (c)(1),
(2) Date: Dec. 15, 2017

(87) PCT Pub. No.: WO2016/202893
PCT Pub. Date: Dec. 22, 2016

(65) Prior Publication Data
US 2018/0176799 A1 Jun. 21, 2018

Related U.S. Application Data

(60) Provisional application No. 62/193,338, filed on Jul. 16, 2015, provisional application No. 62/180,131, filed on Jun. 16, 2015.

(51) Int. Cl.
*H04W 16/32* (2009.01)
*H04B 7/155* (2006.01)
(Continued)

(52) U.S. Cl.
CPC ........ *H04W 16/32* (2013.01); *H04B 7/15507* (2013.01); *H04B 7/2606* (2013.01); *H04W 84/045* (2013.01)

(58) Field of Classification Search
CPC ..... H04W 48/18; H04W 60/00; H04W 28/02; H04W 76/27
(Continued)

(56) References Cited

U.S. PATENT DOCUMENTS 8,929,288 B2   1/2015   Stewart et al.
9,748,906 B2   8/2017   Stewart et al.
(Continued)

FOREIGN PATENT DOCUMENTS

WO   2015015766 A1   2/2015
WO   2016202893 A1   12/2016

OTHER PUBLICATIONS

Bhat et al., "LTE-Advanced: An Operator Perspective", IEEE Communications Magazine, Feb. 2002, pp. 104-114, vol. 50, No. 2.
(Continued)

*Primary Examiner* — Sam Bhattacharya
(74) *Attorney, Agent, or Firm* — Fogg & Powers LLC

(57) ABSTRACT

Examples of distributed base station functionality in a telecommunication system (e.g., a distributed antenna system) are disclosed. In some aspects, the telecommunication system can include an interface with circuitry configured to communicate with one or more base-station entities, base-station components (such as baseband units or remote radio heads), or core-network entities. The telecommunication system can also include radio units that are positioned in an area for providing wireless coverage to terminal devices. The telecommunication system can also include a head-end unit that is communicatively coupled between the interface and the radio units. One or more devices in the telecommunication system can include a low-layer processing module. In some aspects, the low-layer processing module can perform functionality of a secondary eNodeB, such as (but not limited to) radio transport layer processing. In additional or alternative aspects, the low-layer processing module can perform physical layer processing that is split between uplink physical layer processing and downlink physical layer processing and/or split between secondary and primary physical layer processing.

30 Claims, 6 Drawing Sheets

(51) Int. Cl.
*H04B 7/26* (2006.01)
*H04W 84/04* (2009.01)

(58) Field of Classification Search
USPC .......... 370/252, 280, 328; 455/435.1, 435.2, 455/458
See application file for complete search history.

(56) References Cited

U.S. PATENT DOCUMENTS

| | | |
|---|---|---|
| 9,800,298 B2 | 10/2017 | Stewart et al. |
| 2012/0329523 A1 | 12/2012 | Stewart et al. |
| 2013/0003658 A1 | 1/2013 | Stewart et al. |
| 2014/0293784 A1* | 10/2014 | Haberland ............ H04W 28/08 370/235 |
| 2015/0078258 A1 | 3/2015 | Stewart et al. |
| 2016/0149678 A1* | 5/2016 | Akimoto ............... H04L 5/0035 370/330 |

OTHER PUBLICATIONS

International Searching Authority, International Search Report and Written Opinion from PCT Application No. PCT/EP2016/063811 dated Aug. 29, 2016, pp. 1-13, Aug. 29, 2016, WO.
LTE, "Multiple TA Scenario Analysis", "3GPP TSG-RAN WG2 Meeting #73bis, R2-111909, Agenda Item 7.1", Apr. 11-15, 2011, Published in: CN.

* cited by examiner

TELECOMMUNICATION SYSTEMS WITH DISTRIBUTED BASE STATION FUNCTIONALITY

CROSS-REFERENCE TO RELATED APPLICATIONS

This application is a National Stage Application of PCT Application No. PCT/EP2016/063811 filed on Jun. 15, 2016 and titled "TELECOMMUNICATION SYSTEMS WITH DISTRIBUTED BASE STATION FUNCTIONALITY" and claims benefit to U.S. Provisional Application Ser. No. 62/193,388, filed Jul. 16, 2015 and titled "Repeater with Distributed Base Station Physical Layer Processing," and to U.S. Provisional Application Ser. No. 62/180,131, filed Jun. 16, 2015 and titled "Increasing Distributed Antenna System Capacity using Secondary eNodeB Functionality," the contents of both all of which are incorporated herein by reference in their entirety.

TECHNICAL FIELD

This disclosure involves telecommunications and particularly (although not necessarily exclusively), telecommunication systems with distributed base station functionality.

BACKGROUND

Examples of a telecommunication system may include a distributed antenna system ("DAS"), a repeater, or a radio access network. The telecommunication system can be communicatively coupled to base stations, such as (but not limited to) an eNodeB that is compliant with a Long Term Evolution ("LTE") standard.

The telecommunication system can be used to provide wireless communication coverage in a variety of environments, particularly in large structures such as office buildings, convention halls, airports, stadiums, and the like. A DAS, for example, can include one or more head-end units (e.g., master units) that are communicatively coupled to one or more base stations. The DAS can also include multiple radio units that are communicatively coupled to a head-end unit. The radio units, each of which can include one or more transceivers and antennas, can be distributed across a coverage area. The radio units can transmit downlink signals from a base station to mobile phones or other terminal devices in coverage areas serviced by the radio units. Radio units can also receive uplink signals from terminal devices and transmit the uplink signals to the head-end unit.

A DAS or other telecommunication system can be implemented using the Open Systems Interconnection model ("OSI model"), which is a conceptual model that characterizes and standardizes the communication functions of telecommunication systems without regard to their underlying internal structure and technology. The OSI model allows interoperability of a diverse communication systems by partitioning the communication system into abstraction layers. Each layer serves the layer above and is served by the layer below. For example, a physical layer may be the lowest layer in an OSI model. Processing in the physical layer may include defining the physical connection between two devices including the transmission medium, signal timing, transmission mode, etc.

SUMMARY

Examples of distributed base station functionality in a telecommunication system (e.g., a distributed antenna system) are disclosed. In some aspects, the telecommunication system can include an interface with circuitry configured to communicate with one or more base-station entities, base-station components, or core-network entities. The telecommunication system can also include radio units that are positioned in an area for providing wireless coverage to terminal devices. The telecommunication system can also include a head-end unit that is communicatively coupled between the interface and the radio units. One or more devices in the telecommunication system can include a low-layer processing module. In some aspects, the low-layer processing module can perform functionality of a secondary eNodeB, such as (but not limited to) radio transport layer processing. In additional or alternative aspects, the low-layer processing module can perform physical layer processing that is split between uplink physical layer processing and downlink physical layer processing and/or split between secondary and primary physical layer processing.

The details of one or more aspects and examples are set forth in the accompanying drawings and the description below. Other features and aspects will become apparent from the description, the drawings, and the claims.

DETAILED DESCRIPTION

Figure 1:
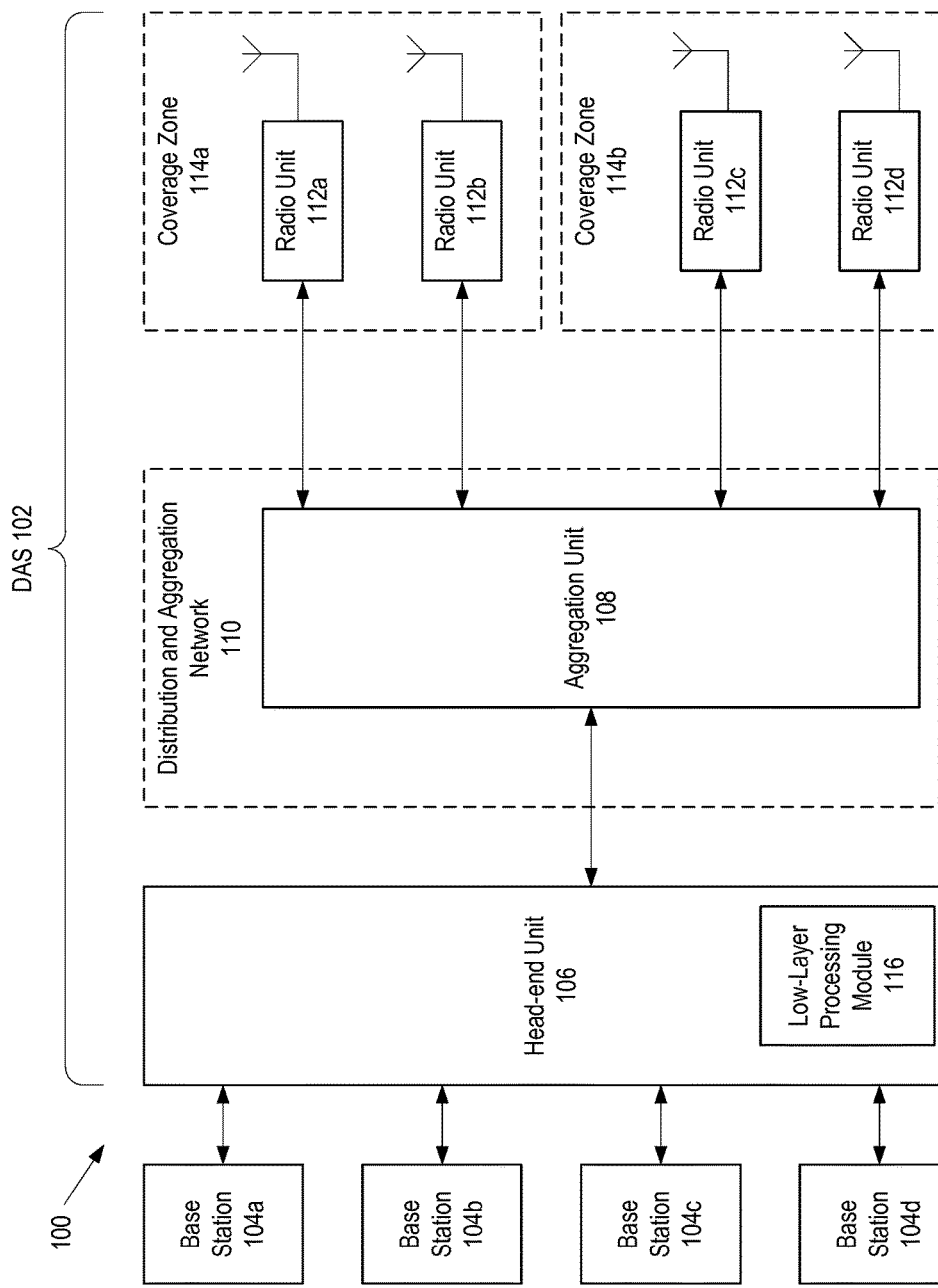
FIG. 1 is a block diagram depicting an example of a telecommunication system that includes a distributed antenna system ("DAS") with a low-layer processing module for distributing base station functionality according to one aspect of the present disclosure.

Certain aspects and features relate to distributing low-layer processing or other functions from a base station (e.g., an eNodeB) to units in a telecommunication system. A telecommunication system can be any system of communicatively coupled devices that extend wireless communication coverage. Examples of a telecommunication system include a distributed antenna system ("DAS"), a repeater, or a radio access network. Distributing low-layer processing or other functions from a base station may include, for example, units in the telecommunication system performing physical ("PHY") layer processing and radio transport layer processing.

Units in a telecommunication system can be communicatively coupled via digital links using one or more suitable protocols. Examples of suitable protocols for a digital link include Ethernet, Synchronous Ethernet, Common Public Radio Interface ("CPRI"), Synchronous Optical Networking ("SONET"), etc. In some aspects, the capacity of the telecommunication system may be improved by incorporating functionality of a base station, such as low-layer processing, into one or more units of the telecommunication system.

In some aspects, the telecommunication system may be a repeater system. PHY layer functionality from a base station can be distributed among devices or other elements of the repeater system, such as a switching transport unit or radio units. For example, building blocks of physical layer entities (e.g., encoders and modems) may be distributed among different elements of a repeater. In another example, radio transport layer functionality (e.g., detecting and correcting errors in physical layer communications) for a base station may be distributed among components of the repeater. A repeater that is coupled to a base station and that includes base station functionality can form a distributed base station.

In some aspects, base station functionality can be distributed among devices of a telecommunication system that is compliant with a Long Term Evolution ("LTE") standard. An example of an LTE base station whose functionality can be integrated into a DAS or repeater is a secondary eNodeB ("SeNB"). An SeNB can be a low-complexity base station that implements lower layers of a protocol stack, such as layers used for radio transport.

In some aspects, a low-complexity base station may implement low-layer processing without implementing higher-layer processing, such as layers used for encryption. Higher-layer processing may be performed by an external base station in communication with a DAS, a repeater, or other telecommunication system that is used for distributing base station functionality. One example of an external LTE base station that may communicate with a DAS, a repeater, or other telecommunication system that is used for distributing base station functionality is a Master eNodeB ("MeNB"). Other suitable base stations may also be used in the manner described in this disclosure with respect to MeNBs.

The low complexity of an SeNB can allow the SeNB functionality to be implemented by one or more suitable devices in a telecommunication system communicatively coupled to an MeNB or other suitable base station. For example, in a DAS, one or more of a head-end unit and the radio units can include an SeNB module or other low-layer processing module for implementing SeNB functionality. The SeNB module can implement at least one radio transport layer of a protocol used by the base station that is in communication with the head-end unit.

In some aspects, including PHY layer functionality of a base station in a repeater can reduce the resources required for communicating data via the repeater. For example, in a repeater, the resource cost per bit may be increased due in part to the cost of full blown base stations at the repeater site and the need to terminate a radio frequency ("RF") interface. Including PHY layer functionality in a repeater can reduce the fronthaul cost (e.g., by reducing the bandwidth used to transmit control data) between a central base station hotel and the repeater site. For example, the digital transport bandwidth on external and internal interfaces can be reduced as compared to an in-phase/quadrature ("IQ") transport such as CPRI. This reduction in transport bandwidth can lead to capital expenditure and operating expenditure savings.

FIG. 1 depicts an example of a telecommunication system 100 in which base station functionality can be distributed. This example of a telecommunication system 100 includes a DAS 102 communicatively coupled to one or more base-station entities, base-station components (such as baseband units or remote radio heads), or core-network entities. In this example, the base-station entities, base-station components, or core-network entities comprise base stations 104a-d. Although a DAS 102 is depicted in FIG. 1, other types of telecommunication systems, such as a repeater or radio access network, can be used. Furthermore, the base stations 104a-d can be used by one or more cellular providers that employ different air interfaces.

The DAS 102 depicted in FIG. 1 includes a single head-end unit 106 that is communicatively coupled to multiple base stations 104a-d. However, other implementations are possible. For example, one or more base stations associated with a first provider may be communicatively coupled (e.g., via one or more physical links) to a first head-end unit or set of head-end units, one or more base stations associated with a second provider may be communicatively coupled (e.g., via one or more physical links) to a second head-end unit or set of head-end units, etc.

The DAS 102 also includes multiple spatially separated radio units 112a-d that are communicatively coupled to the head-end unit 106 via a distribution and aggregation network 110. The radio units 112a-d can provide signal coverage to terminal devices in one or more coverage zones 114a, 114b in an area serviced by the DAS 102 (e.g., a building, a tunnel, etc.). The radio units 112a-d may include, for example, transceiving devices that include or are communicatively coupled to one or more antennas. The distribution and aggregation network 110 can include one or more aggregation units 108. In some aspects, the aggregation unit 108 can be separate from the head-end unit 106, as depicted in FIG. 1. In other aspects, the aggregation unit 108 can be included in the head-end unit 106.

In some aspects, a given physical link between a head-end unit 106 and an aggregation unit 108 can be used to communicate data for multiple logical links. In one example, a first logical link supported by a physical link can represent data traffic for a first provider, a second logical link supported by the same physical link can represent data traffic for a second provider, etc. In another example, a first logical link supported by a physical link can represent a first type of data traffic (e.g., CPRI data), a second logical link supported by the same physical link can represent a second type of data traffic (e.g., X1 data), etc. Different data types can be encapsulated in Ethernet or CPRI frames or multiplexed via wave-division multiplexing on the same optical fiber providing a physical link. In additional or alternative aspects, a given physical link between an aggregation unit 108 and a radio unit 112a-d can be used to communicate data for multiple logical links in the manner described above.

The DAS 102 can incorporate base station functionality for communicating with terminal devices in one or more of the coverage zones 114a, 114b that communicate with one or more of the base stations 104a-d via the DAS 102. For example, one or more head-end units 106 can include a low-layer processing module 116 that can distribute base station functionality in the DAS 102.

The low-layer processing module 116 may perform processing from any layer of one or more protocol used by one or more of the base stations 104a-d. In some aspects, the low-layer processing module 116 may perform Layer 1 ("L1") processing, such as PHY layer processing. In additional or alternative aspects, the low-layer processing module 116 may perform radio transport layer processing. In some examples, the capacity of the DAS 102 (e.g., the number of terminal devices that can be serviced by the DAS 102) may be increased by using the low-layer processing module 116 to implement one or more SeNB functions.

The low-layer processing module 116 may include one or more devices or provide functionality for performing processing associated with multiple layers. For example, in some aspects, the low-layer processing module 116 may be an SeNB device or may provide functionality of an SeNB device. The SeNB functionality may include Layer 1 processing as well as other low-layer processing. For example, an SeNB device included in the low-layer processing module 116 may perform radio link control ("RLC") processing, media access control ("MAC") processing, and packet data convergence protocol ("PDCP") functions. The PDCP functions may include compression of user plane data packets, transfer of user data, handover management, and encryption and decryption. The SeNB device may include an S1 interface for communicating with one or more core-network entities. The core network can include entities such as a serving gateway (S-GW) or a Mobility Management Entity (MME) that can be used to provide services to users of the DAS 102. For example, the core network can perform frequency spectrum allocation, call aggregation, and authentication of terminal devices.

For illustrative purposes, FIG. 1 depicts one low-layer processing module 116 located in the head-end unit 106. Other implementations are possible. For example, multiple low-layer processing modules may be located in any component of the DAS 102 or an independent component. In some aspects, the low-layer processing module 116 may be included in other devices (e.g., one or more of an aggregation unit 108, one or more radio units 112a-d, etc.).

In some aspects, the use of one or more low-layer processing module 116 can address challenges associated with transporting large amounts of data (e.g., digitized RF data, digitized IF data, etc.) to radio units that wirelessly communicate with mobile devices or other terminal device. For example, transporting large amounts of digital data may require large amounts of bandwidth between a radio unit and a device that transmits data to the radio unit. These bandwidth requirements for a telecommunication system may be addressed by moving certain lower-layer processing closer to one or more radio units. In some aspects, functionality for multiple processing layers, such as the processing layers involved in SeNB functionality, can be integrated into one or more units of a DAS or repeater, as described herein with respect to FIGS. 2-4. In additional or alternative aspects, physical layer processing (e.g., Layer 1 processing) can be integrated into one or more units of a DAS or repeater, as described herein with respect to FIGS. 5 and 6. Thus, one or more implementations described herein with respect to FIGS. 2-7 can be used, alone or in combination, to address challenges associated with transporting large amounts of data to radio units that wirelessly communicate with terminal devices.

Integrated SeNB Functionality in a DAS

Figure 2:
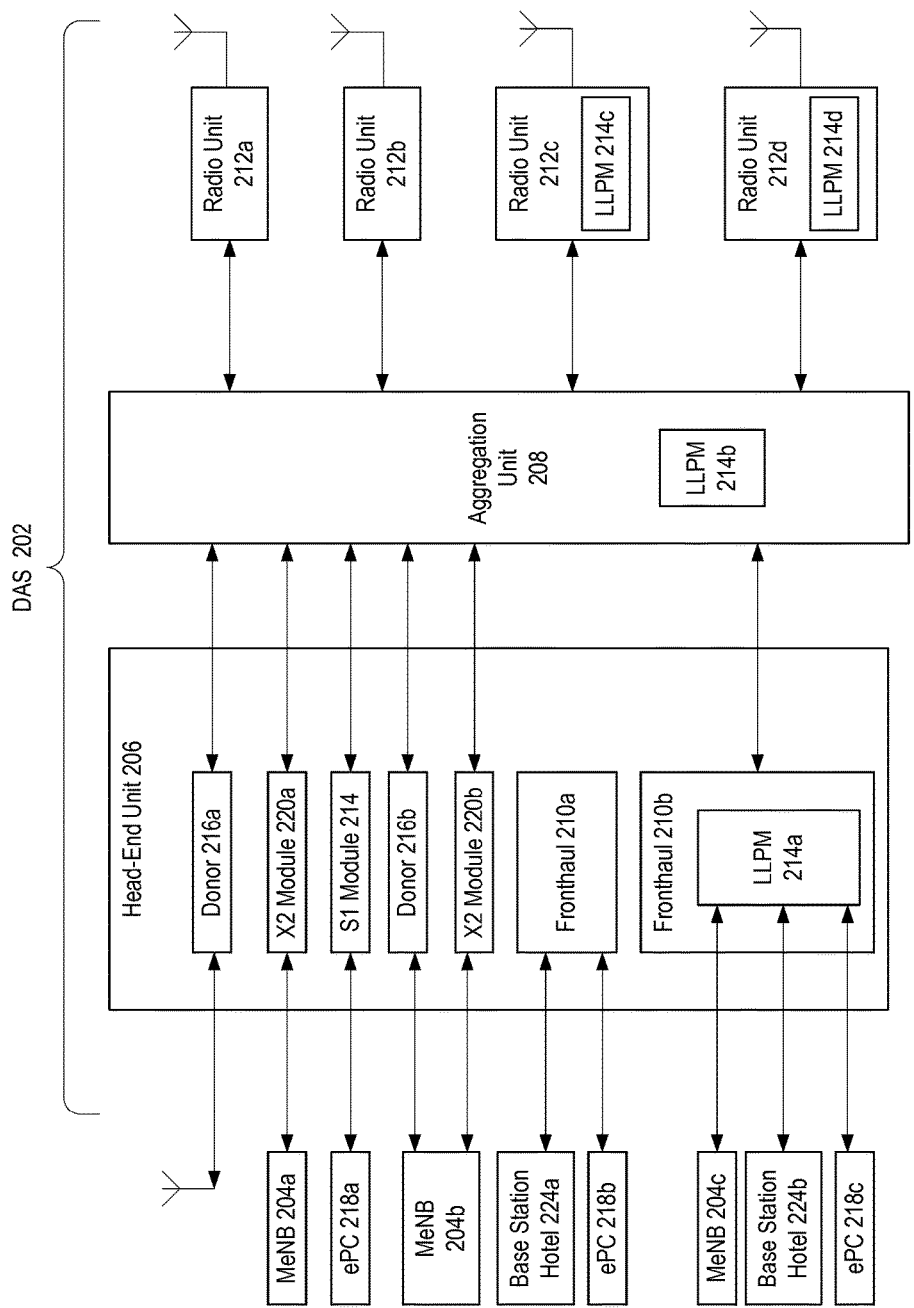
FIG. 2 is a block diagram that logically depicts an example of base station functionality, such as secondary eNodeB ("SeNB") functionality, being integrated into the DAS according to one aspect of the present disclosure.
Figure 3:
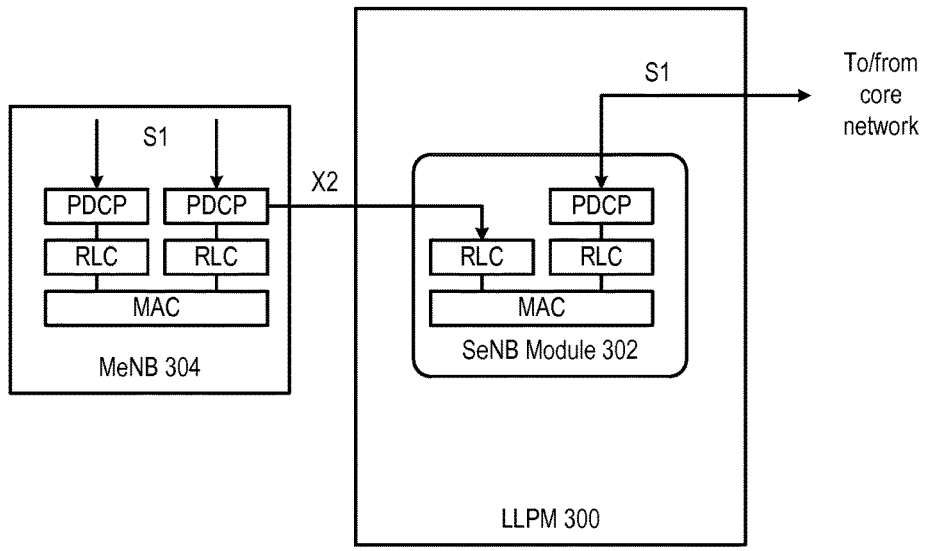
FIG. 3 is a block diagram that logically depicts an example of an SeNB module that can be integrated into a DAS (for example, in a head-end unit, aggregation unit, and/or radio unit) and that has S1 functionality according to one aspect of the present disclosure.
Figure 4:
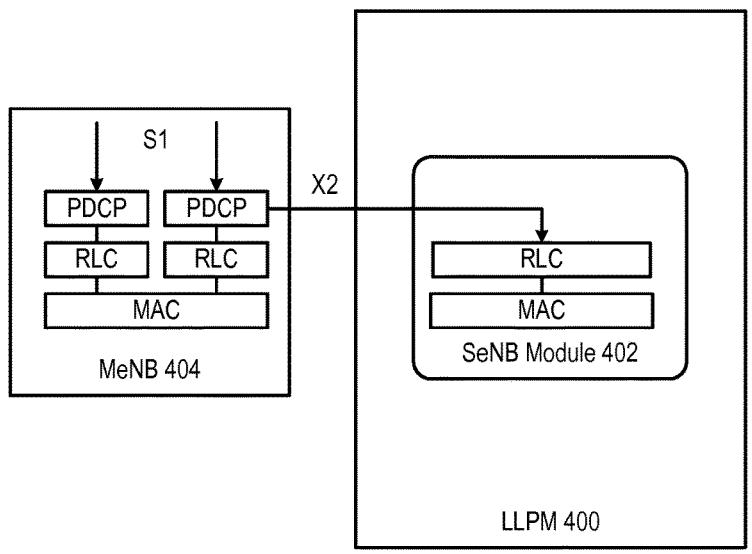
FIG. 4 is a block diagram that logically depicts an example of an SeNB module that can be integrated into a DAS and that can be implemented without S1 functionality according to one aspect of the present disclosure.

In some aspects, a low-layer processing module may be used to implement SeNB functionality, as described herein with respect to FIGS. 2-4. SeNB functionality may be performed in addition to or instead of distributed PHY processing described herein with respect to FIGS. 5 and 6. SeNB functionality can be integrated into (or otherwise included) in a DAS, a repeater, or any other telecommunication system communicatively coupled to one or more base stations, one or more core networks, or any other combination thereof.

For example, FIG. 2 is a diagram that logically depicts an example of SeNB functionality integrated in a DAS 202. The DAS 202 includes low-layer processing modules 214a-d that can perform radio transport layer processing. The DAS 202 also includes a head-end unit 206 communicatively coupled to an aggregation unit 208, which is communicatively coupled to radio units 212a-d. In some aspects, the DAS 202, head-end unit 206, aggregation unit 208, radio units 212a-d, and low-layer processing module 214a may be examples of the DAS 102, head-end unit 106, aggregation unit 108, radio units 112a-d, and low-layer processing module 116, respectively, depicted in FIG. 1.

The head-end unit 206 can include one or more modules. For example, in some aspects, the head-end unit 206 can include donor modules 216a, 216b used for communicating RF data. In the example depicted in FIG. 2, the donor module 216a can communicate RF signals via an antenna. The donor module 216a can communicate RF signals with one or more MeNBs 204b (e.g., a MeNB co-located with a base station).

In additional or alternative aspects, the head-end unit 206 can also include one or more X2 modules 220a, 220b. The X2 modules 220a, 220b of the head-end unit 206 can be termination points for X2 links with MeNBs 204a, 204b. In the example depicted in FIG. 2, the X2 module 220a can communicate X2 data with one or more MeNBs 204a. The X2 module 220a can communicate X2 data with one or more other MeNBs 204b (e.g., an MeNB co-located with a base station).

In additional or alternative aspects, the head-end unit 206 can also include an S1 module 214. The S1 module 214 of the head-end unit 206 can be a termination point for one or more S1 links with one or more EPCs 218a or other core networks. An EPC 218a or other core network can be, for example, a serving gateway for multiple radio access network providers.

In additional or alternative aspects, the head-end unit 206 can include one or more fronthaul devices 210a, 210b. A fronthaul device can communicate IQ (e.g., CPRI or OBSAI), X2, and S1 data with one or more other devices or systems that are external to the DAS 202 (e.g., MeNBs, base stations, or core networks). Each of the fronthaul devices 210a, 210b can be a logical termination point. After a logical termination point, the DAS 202 can implement behavior that, from the perspective of a base station or other external device or system, is similar to the behavior of a remote radio head. For example, in the context of CloudRAN, a fronthaul device can be one logical end of an IQ link (e.g., a CPRI or OBSAI link) between one or more base station hotels 224a, 224b and a unit of the DAS 202. In additional or alternative aspects, each of the fronthaul devices 210a, 210b can be a termination point for an S1 link with one or more core networks, such as one or more EPCs 218b, 218c. In additional or alternative aspects, the fronthaul device 210b can be a termination point for an X2 link with one or more MeNBs 204c.

In some aspects, the head-end unit 206 can include low-layer processing module 214a in a fronthaul device or sub-system to provide a logical termination point for an S1 link, an X2 link, or both. For example, the low-layer processing module 214a can include SeNB functionality.

The SeNB functionality can include communicating IQ and X2 data with one or more MeNBs 204c or other base stations. The SeNB functionality can also include communicating S1 data with one or more EPCs 218c or other core networks.

In some aspects, SeNB or other low-layer processing can be implemented in additional or alternative devices in the DAS 202. For example, a low-layer processing module 214b can be implemented in an aggregation unit 208 (e.g., a switching unit) that may be controlled by the head-end unit 206. In additional or alternative aspects, one or more low-layer processing modules 214c, 214d can be implemented in one or more radio units 212c, 212d. The low-layer processing modules 214c, 214d in the radio units 212c, 212d can implement SeNB functionality. For example, a communication link from a radio unit 212c or 212d that implements SeNB functionality can be used to transmit IQ data as well as X2 and S1 data between the radio unit and one or more MeNBs (e.g., one or more of the MeNBs 204a-c depicted in FIG. 2). In some aspects, each low-layer processing module 214a-d can include one or more Ethernet interfaces via which one or more of X2 data, S1 data, and other packetized data may be communicated. In some aspects, other radio units 212a, 212b may not implement SeNB functionality.

In some aspects, one or more low-layer processing modules can be implemented in one or more of the head-end unit 206 and the aggregation unit 208. For example, for a new installation, if excess bandwidth is available for communicating with one or more radio units, the low-layer processing module 214b can be implemented in the aggregation unit 208. If a system is installed with IQ interfaces, the low-layer processing module 214a can be implemented in the fronthaul 210b or another module in the head-end unit 206. If bandwidth on the link to the radio units 212c, 212d is limited, the low-layer processing modules 214c, 214d can be implemented in the radio units 212c, 212d, respectively.

If the low-layer processing modules 214c, 214d are implemented in the radio unit 212c-d, a communication link can be used for direct communication between the radio unit 212c-d and one or more MeNBs 204a-b without routing the communicated data through the aggregation unit 208 or the fronthaul device 210a-b in the DAS 202. For example, if one or more MeNBs 204a-b are co-located with a DAS 202, a radio unit 212c-d may be able to establish a link with one or more MeNBs 204a-b via a radio link. An aggregation unit 208 can switch IQ data with RF streaming data and X2 packetized data.

In other aspects, X2 and S1 data can be encoded and modulated onto narrowband or broadband IQ data streams. For example, only IQ data streams may be transmitted within the DAS 202. X2 and S1 data can be communicated via modulated IQ signals.

For example, the head-end unit 206 can receive S1 and X2 data from various sources. The head-end unit 206 can encode the received S1 and X2 data and modulate IQ signals transmitted via the DAS 202 with the encoded S1 and X2 data. One or more radio units 212a-d can decode S1 and X2 data from IQ signals received from the head-end unit 206 (either directly or via the aggregation unit 208). The radio units 212a-d can use the decoded S1 and X2 data as needed to establish or maintain communication links with terminal devices in communication with the DAS 202.

In some aspects, different IQ data streams can be communicated in parallel. In some aspects, these parallel IQ data streams can include data from multiple providers that are serviced by the DAS 202. In additional or alternative aspects, these parallel IQ data streams can include parallel MIMO data streams transmitted via the DAS 202.

Examples of other signals that may be communicated via a DAS 202 with SeNB functionality include (but are not limited to) baseband IQ signals, intermediate frequency ("IF") IQ signals, digital IF signals with only real components (e.g., I component only), zero-IF signals, etc.

In other aspects, X2 and S1 data can be encoded and modulated onto wideband, digital RF data streams. For example, digital RF interfaces can be used for communication within the DAS 202. In some aspects, a low-layer processing module 214a-d can include an RF interface for communicating wireless RF data with an antenna. One or more low-layer processing modules 214a-d can be implemented in one or more of a head-end unit 206 and an aggregation unit 208. Within the DAS 202, data can be communicated among the head-end unit 206, the aggregation unit 208, and the radio units 212a-d as digital RF signals.

For example, X2 and S1 data can be communicated via modulated, digital RF signals. The head-end unit 206 can receive S1 and X2 data from various sources. The head-end unit 206 can encode the received S1 and X2 data and modulate digital RF signals transmitted via the DAS 202 with the encoded S1 and X2 data. One or more radio units 212a-d can decode S1 and X2 data from digital RF signals received from the head-end unit 206 (either directly or via the aggregation unit 208). The radio units 212a-d can use the decoded S1 and X2 data as needed to establish or maintain communication links with terminal devices in communication with the DAS 202.

In some aspects, different digital RF data streams can be communicated in parallel. In some aspects, these parallel digital RF data streams can include parallel MIMO data streams transmitted via the DAS 202.

In other aspects, X2 and S1 data can be encoded and modulated onto analog RF data streams. For example, analog RF interfaces can be used for communicating data among the head-end unit 206, the aggregation unit 208, and the radio units 212a-d using analog RF signals.

The X2 and S1 data can be communicated via modulated, analog RF signals. The head-end unit 206 can receive S1 and X2 data from various sources. The head-end unit 206 can encode the received S1 and X2 data and modulate analog RF signals transmitted via the DAS 202 with the encoded S1 and X2 data. One or more radio units 212a-d can decode S1 and X2 data from analog RF signals received from the head-end unit 206 (either directly or via the aggregation unit 208). The radio units 212a-d can use the decoded S1 and X2 data as needed to establish or maintain communication links with terminal devices in communication with the DAS 202.

In some aspects, frequency shifting methods can be used to communicate MIMO signals. For example, if the head-end unit 206 receives a set of MIMO signals having the same frequency or overlapping frequencies, the head-end unit 206 can shift the frequencies of one or more MIMO signals in the set. Shifting the frequencies of one or more MIMO signals can allow the set of MIMO signals to be transmitted via the DAS 202 to various radio units 212a-d in parallel. The radio units 212a-d that receive the MIMO signals can modify the frequency-shifted MIMO signals so that they have the correct frequency (e.g., their original frequencies) for transmission to terminal devices operating in a MIMO mode.

In some aspects, the low-layer processing module 214a-d can be used to implement SeNB functionality in DAS 202 via one or more features provided in LTE Release 12. For example, the X2 protocol is a LTE protocol for communicating between eNodeBs or other base stations. The X2 protocol includes X2-C, which is a control plane protocol, and X2-U, which is a user-plane protocol.

In another example, the S1 protocol is an LTE protocol for communicating between eNodeBs (or other base stations) and an Evolved Packet Core ("EPC") network or other core network. A core network can include a group of devices in a telecommunication network that can provide services to users of the telecommunication network. Examples of services provided by a core network include frequency spectrum allocation, call aggregation, authentication of terminal devices or users, call switching, service invocation, gateways to other networks, etc. The S1 protocol includes S1-U, which is a user plane protocol that can be used for communicating with a serving gateway ("S-GW") that routes and forwards user data packets. The S1 protocol also include S1-MME, which is a protocol for communicating with a mobility management entity ("MME") of a core network that manages tracking and paging procedures and idle modes of mobile devices.

In one example, a base station may not be co-located in a building or one or more of the coverage zones serviced by the DAS 202. A link is established from the DAS 202 to the base station to allow the terminal devices to communicate directly with one or more base stations. In another example, a repeater in communication with one or more base stations can receive downlink signals via a communication link between the repeater and one or more base stations and retransmit the downlink signals to a first terminal device via a communication link (and vice versa in the uplink direction). Other communication links can be used for communication between one or more low-layer processing modules 214a-d in the DAS 202 and one or more terminal devices. Secondary links (not depicted in FIG. 4) between low-layer processing module 214a-d and the terminal devices allow the terminal devices to communicate with the low-layer processing module 214a-d in case data offload is needed.

One or more low-layer processing modules 214a-d may communicate with one or more base stations via X2-C and X2-U communication links (e.g., wireline or microwave links). A given low-layer processing module 214a-d can be associated with a given base station. In some aspects, each of the radio units 212a-d of the DAS 202 can include one or more antennas for implementing one or more communication links between the low-layer processing module 214a-d and their associated terminal devices in one or more coverage zones.

The DAS 202 can implement SeNB functionality depicted using low-layer processing module 214a-d. A DAS 202, or other telecommunication system with SeNB functionality, can support multiple telecommunication providers. Data traffic from different providers can be communicated in parallel using the same physical link. For example, multiple logical links corresponding to different providers can be established using a common physical link. In one example, a first logical link over a physical link can represent data traffic for a first provider, a second logical link over the same physical link can represent data traffic for a second provider, etc. In another example, a first logical link over a physical link can include a first type of data traffic (e.g., CPRI data), a second logical link over the same physical link can include a second type of data traffic (e.g., X1 data), etc.

Any suitable implementation can be used to share a common physical link among multiple logical links. In some aspects, data corresponding to different logical links can be encapsulated in Ethernet frames that are communicated via the same physical link. In additional or alternative aspects, data corresponding to different logical links can be encapsulated in CPRI frames (e.g., using embedded Ethernet within CPRI) that are communicated via the same physical link. In additional or alternative aspects, data corresponding to different logical links can be multiplexed onto the same physical link using wave-division multiplexing. Other implementations are possible for sharing a common physical link among multiple logical links.

SeNB functionality can be implemented in a DAS 202, a repeater (e.g., repeater 500 in FIG. 2), or another telecommunication system in any suitable manner. In some aspects, low-layer processing modules can be plug-in cards or other devices that can be installed in one or more head-end units, one or more aggregator units, one or more radio units, or some combination thereof. In additional or alternative aspects, low-layer processing modules can be integrated into one or more head-end units, one or more aggregator units, one or more radio units, or some combination thereof. Integrating a selectively activated SeNB device or other low-layer processing module may be useful for units such as radio units, where installing additional hardware may be impractical.

Low-layer processing modules can be selectively activated or otherwise configured based on the requirements for the DAS 202. For example, a unit in a DAS 202 (e.g., a head-end unit 206, an aggregator unit 208, or a radio unit 212a-d) can include an integrated SeNB device. The SeNB device in the unit can be activated (e.g., via software) if the DAS 202 needs to provide SeNB functionality. This functionality may include allocating bandwidth or other resources used by the SeNB device among different providers that are serviced by the DAS 202.

In some aspects, low-layer processing modules can be implemented in a scalable manner. For example, multiple low-layer processing modules can be implemented as firmware in a field-programmable gate array ("FPGA"), as different software engines executed by one or more processing devices in a unit in of a DAS, as separate physical devices (e.g., multiple SeNB interface cards or integrated SeNB devices) in a unit of a DAS 202, etc. In some examples, the low-layer processing module is an interface card or other suitable device that includes one or more devices or other circuitry for implementing SeNB functionality and that may be installed in a unit of the DAS 202. Implementing SeNB functionality in the DAS 202 can include performing one or more functions using one or more low-layer processing modules that may otherwise be performed by a separate eNodeB system (e.g., a SeNB).

The SeNB functionality provided by the DAS 202 can be used for communication with a radio access network that includes one or more MeNBs. The SeNB functionality of the DAS 202 can involve managing the communication links with terminals devices. The lower complexity of the SeNB functionality can allow this SeNB functionality to be integrated directly into components in the DAS 202.

One or more MeNBs can communicate with one or more low-layer processing modules 214a-d that are included in the DAS 202. The interface between one or more MeNBs and one or more low-layer processing modules 214a-d in the DAS 202 can use the X2-C and X2-U protocols. For example, a communication link can be used to communicate data between one or more MeNBs and the DAS 202 that is formatted according to the 2-C and the X2-U protocols.

In some aspects, an air interface can be used to improve the efficiency with which resources are used by the DAS 202. For example, a terminal device can have a first communication link for communication with one or more MeNBs and a second communication link for communication with one or more low-layer processing modules 214a-d of the DAS 202. Communications with one or more MeNBs may be limited to signaling, which may reduce the resources used in the communication link. The S1 interface can be used by one or both of one or more MeNBs and one or more low-layer processing modules 214a-d to communicate with a core network. The DAS 202 may support multiple operators and have multiple S1 interfaces to multiple core networks.

Downlink data received by one or more MeNBs from the core network can be encrypted in the PDCP layer. One or more MeNBs processes the downlink data and provides the downlink data to one or more low-layer processing module 214a-d. One or more MeNBs also processes uplink data being received by one or more low-layer processing modules 214a-d via one or more of the radio links. The low-layer processing modules 214a-d can implement lower-level protocols, such as RLC and MAC protocol, used for a radio interface transmission. The low-layer processing modules 214a-d can receive processed downlink data from one or more MeNBs via the link. The low-layer processing modules 214a-d can transmit downlink data to terminal devices using the RLC and MAC protocols. The low-layer processing modules 214a-d can also transmit uplink data to one or more MeNBs via the link. The low-layer processing modules 214a-d can also receive uplink data and initiate retransmission of uplink data received from the terminal devices using the RLC and MAC protocols.

In some aspects, the low-layer processing modules 214a-d may be low complexity and can be at least partially controlled by one or more MeNBs. The low-layer processing modules 214a-d may not implement encryption, such that unauthorized accessed to the X2-C and X2-U interfaces between one or more MeNBs and low-layer processing module 214a-d would not provide access to the unencrypted data.

In some examples, a CloudRAN implementation can be used for a base station (e.g., one or more MeNBs) co-located with a DAS 202 or a base station that is remotely located from the DAS 202. The data rate used for transmitting X2-C and X2-U data may be comparable to or better than the data rate used for a CPRI protocol. For example, in a CloudRAN environment, a communication link between one or more MeNBs and one or more low-layer processing module 214a-d can utilize fewer resources using the X2-C and X2-U protocols as compared to transmitting IQ data via CPRI or a similar protocol.

In some aspects, a SeNB module in a DAS can perform some or all of the functions performed by a separate SeNB. For example, FIG. 3 is a block diagram that logically depicts an example of a SeNB module 302 that can be integrated into a DAS. The SeNB module may be included in low-layer processing module 300. The low-layer processing module 300 may be, for example, one of the low-layer processing modules 214a-d depicted in FIG. 2. The SeNB module 302 can include an S1 interface for communicating with an EPC or other core network. The SeNB module 302 may perform RLC processing, MAC processing, and PDCP functions. In some aspects, the SeNB module 302 can be used to communicate using the LTE-U (unlicensed) spectrum. In additional or alternative aspects, the SeNB module 302 can support license-assisted access.

In some aspects, the SeNB module 302 can communicate with an MeNB 304 that can control communication with terminal devices. In some aspects, terminal device can communicate with the MeNB (e.g. for Voice over LTE services). The SeNB module 302 can communicate with an MeNB 304 via any suitable communication link, such as, for example, the X2 communication link depicted in FIG. 3. The MeNB 304 can also perform one or more of RLC processing, MAC processing, and PDCP functions. In some aspects, the X2 traffic can be encrypted by the PDCP layer in the MeNB 304.

Although FIG. 3 depicts a single SeNB module 302, other implementations are possible. In some aspects, SeNB functionality may be distributed among multiple units of a DAS. For example, a first unit of the DAS may include a first SeNB or low-layer processing module that performs PHY-layer processing, and another unit or set of units of the DAS may include one or more additional SeNB or low-layer processing modules that implement one or more of RLC-layer processing, MAC-layer processing, and PDCP-layer processing.

SeNB Functionality Without S1 Interface

In some aspects, an SeNB module can be implemented without S1 functionality, as depicted in FIG. 4. FIG. 4 logically depicts an example of an SeNB module 402 that can be integrated into a DAS. The SeNB module may be included in low-layer processing module 400. The low-layer processing module 400 may be, for example, one of the low-layer processing modules 214a-d depicted in FIG. 2. The SeNB module 402 omits an S1 interface for communicating with an EPC or other core network. But the SeNB module 402 can perform RLC processing and MAC processing. In some aspects, the SeNB module 402 can be used to communicate using the LTE-U (unlicensed) spectrum. In additional or alternative aspects, the SeNB module 402 can support license-assisted access.

In some aspects, the SeNB module 402 can communicate with a MeNB 404 that can control communication with terminal devices. In some aspects, terminal device can communicate with the MeNB (e.g. for Voice over LTE services). The SeNB module 402 can communicate with a MeNB 404 via any suitable communication link, such as, for example, the X2 communication link depicted in FIG. 3. The MeNB 404 can also perform one or more of RLC processing, MAC processing, and PDCP functions. In some aspects, the X2 traffic can be encrypted by the PDCP layer in the MeNB 404.

Although FIG. 4 depicts a single SeNB module 402, other implementations are possible. In some aspects, SeNB functionality may be distributed among multiple units of a DAS. For example, a first unit of the DAS may include a first SeNB or low-layer processing module that performs PHY-layer processing, and another unit or set of units of the DAS may include one or more additional SeNB or low-layer processing modules that implement one or more of RLC-layer processing and MAC-layer processing.

Distributed PHY Layer Functionality

Figure 5:
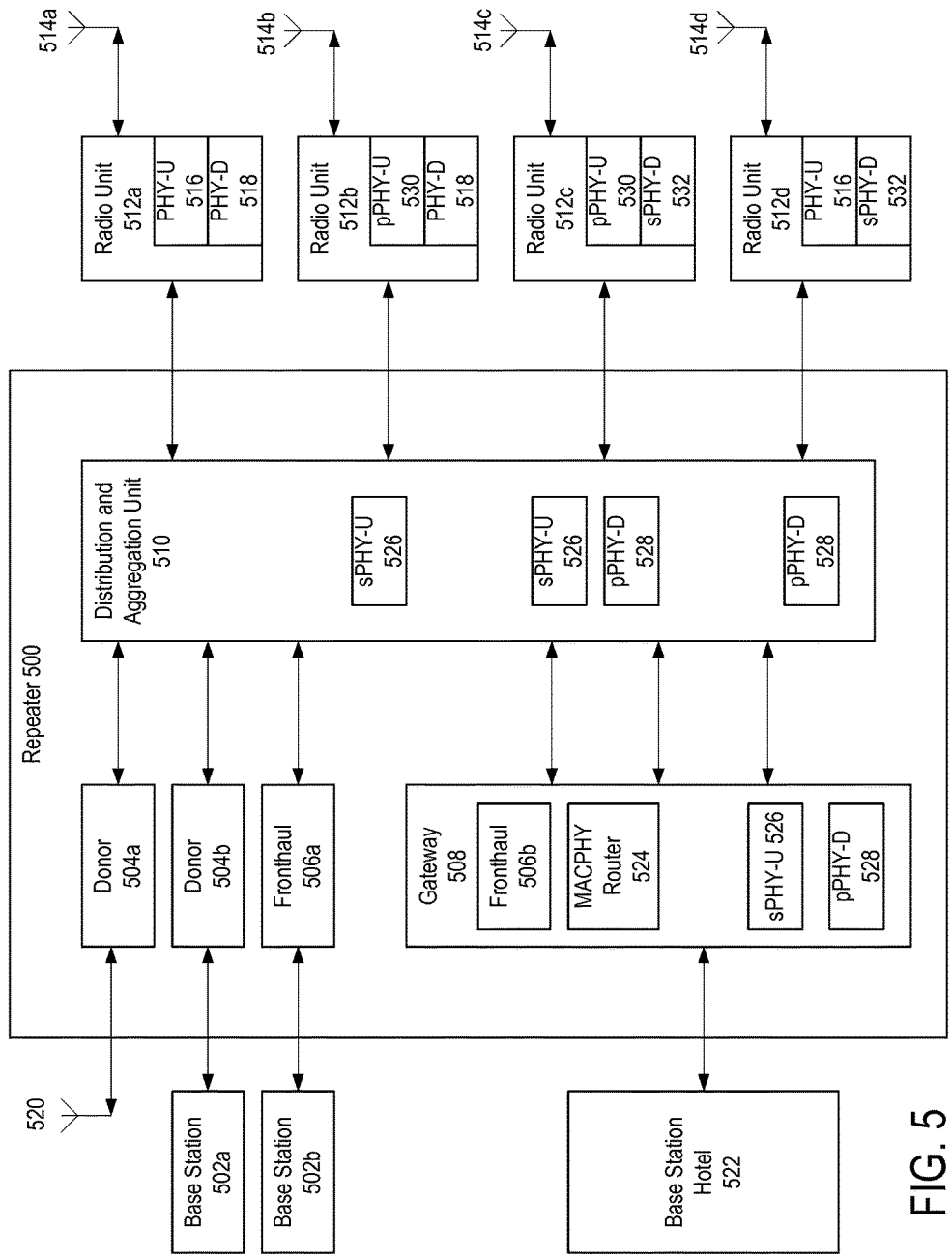
FIG. 5 is a block diagram depicting an example of a repeater that includes distributed physical ("PHY") layer functionality according to one aspect of the present disclosure.

In some aspects, other base station functionality can also be distributed in other communication systems that are used to extend wireless coverage of one or more base stations. For example, FIG. 5 depicts an example of a repeater system 500 that can include distributed PHY layer functionality. In some aspects, the repeater system 500 can be implemented using one or more repeater devices communicatively coupled to base stations and to radio units, as depicted in FIG. 5. In additional or alternative aspects, the repeater system 500 can be implemented using one or more devices of the DAS 202 depicted in FIG. 2.

In the example depicted in FIG. 5, a repeater 500 is communicatively coupled to one or more base-station entities, base-station components (such as baseband units or remote radio heads), or core-network entities. More specifically, in this example, the repeater 500 is communicatively coupled to base stations 502*a-b*. The repeater 500 can include donor units 504*a-b*, a fronthaul termination interface 506*a*, a gateway 508, a distribution and aggregation unit 510, and radio units 512*a-d*. The radio units 512*a-d* can be coupled to, or include, antennas 514*a-d* for providing wireless coverage in an area. The radio units 512*a-d* can include circuitry for, among other things, processing signals, up-converting and amplifying signals, down-converting signals, and filtering signals. The distribution and aggregation unit 510 can include switching transport circuitry for communicating signals between the radio units and the donor units 504*a-b*, fronthaul termination interface 506*a*, and the gateway 508.

The donor units 504*a-b* can include circuitry that can convert signals between radio frequency analog signals and digital signals. The fronthaul termination interface 506*a* can provide an interface for signals in standardized formats, such as CPRI and OBSAI. CloudRAN applications with IQ interface (CPRI/OBSAI) can be supported by the fronthaul termination interface 506*a*. The gateway 508 may also include in a fronthaul termination interface 506*b*. Although various different examples of base stations 502*a-b* are shown, in other aspects, one type of base station, and one type of interface, may be used.

The repeater 500 can distribute PHY layer functionality among different devices.

The PHY layer functionality can be split between uplink PHY layer functionality ("PHY-U") 516 and downlink PHY layer functionality ("PHY-D") 518. The uplink direction in the repeater 500 can include the signal path from a radio unit 512*a-d* towards a base station 502*a-b*. The downlink direction in the repeater 500 can include the signal path from the base station 502*a-b* towards the radio unit 512*a-d*. Each of the PHY-U 516 and PHY-D 518 can be further split between primary and secondary physical layer functionality.

Donor units 504*a-b* can receive RF signals from base stations 502*a-b* or directly from the air via a wireless antenna 520. For the LTE carriers being served by the integrated LTE PHYs, the gateway 508 can terminate the fronthaul link with a base station hotel 522 (e.g., provide secure communication). The communication between MAC layer and PHY layer with the base station hotel 522 can be terminated by a MACPHY message router 524. For example, the MACPHY communication can use messages defined in the Femto Application Programming Interface ("FAPI") industry standard. The MAC layer can be implemented in baseband units of the base station hotel 522. The base station hotel 522 can also have a fronthaul termination (e.g., a secure gateway).

The MACPHY message router 524 can communicate with the secondary PHY-U ("sPHY-U") 526 via uplink media access control/physical interface ("MACPHY-U") and with the primary PHY-D ("pPHY-D") 528 via downlink media access control/physical interface ("MACPHY-D"). In some aspects, the sPHY-U 526 and pPHY-D 528 can be included in the gateway 508, as depicted in FIG. 5. In other aspects, the sPHY-U 526 and pPHY-D 528 can be included in the distribution and aggregation unit 510 or the radio units 512*a-d*.

In some aspects, primary PHY-U ("pPHY-U") 530 and secondary PHY-D ("sPHY-D") 532 are included in the radio units 512*a-d*. In additional or alternative aspects, a radio unit 512*a-d* may include either PHY-U 516 (sPHY-U 526+pPHY-U 530) or pPHY-U 530. In additional or alternative aspects, a radio unit 512*a-d* may include either PHY-D 518 (sPHY-D 532+pPHY-D 528) or sPHY-D 532.

In the example depicted in FIG. 5, the radio unit 512*a* includes PHY-U 516 and PHY-D 518 functionalities. The radio unit 512*b* includes pPHY-U 530 and PHY-D 518 functionality. The distribution and aggregation unit 510 or the gateway 508 includes sPHY-U 526 functionality for communicating with radio unit 512*b*. The radio unit 512*c* includes pPHY-U 530 functionality and sPHY-D 532 functionality. The distribution and aggregation unit 510 or the gateway 508 includes one or both sPHY-U 526 and pPHY-D 528 functionality for communicating with radio unit 512*c*. The radio unit 512*d* includes PHY-U 516 functionality and sPHY-D 532 functionality. The distribution and aggregation unit 510 or the gateway 508 includes pPHY-D 528 functionality for communicating with radio unit 512*d*.

Although four radio units 512*a-d* are shown, any number of radio units can be included in the repeater 500. In addition, various configurations of PHY layer functionality split can be implemented in the repeater 500. In some repeaters, pPHY-U 530 and sPHY-D 532 functionalities are in the radio units 512*a-d*, while the other types of PHY layer functionality may be in the radio units 512*a-d* or split and included in the distribution and aggregation unit 510.

The repeater 500 may communicate digital packetized data using a modulated broadband signal represented by an IQ stream. The packet data can be converted by a modem at each end of the transport link. In some aspects the repeater 500 can communicate packetized (e.g., Ethernet) data in which the IQ streams are packetized and MACPHY/P2S are embedded in the packet traffic. In additional or alternative aspects, the repeater 500 can communicate packetized data and an IQ stream (e.g., CPRI) in which IQ signals are streamed is antenna containers ("AxC") and MACPHY/P2S are transported via an embedded Ethernet link. The Ethernet link data format may be similar to 100 baseFX (e.g., 4b5b encoding). In additional or alternative aspects, the repeater 500 can communicate packetized data and IQ streams in which MACPHY/P2S are transported on an individual IQ stream that is generated by a modem. In additional or alternative aspects, the repeater 500 can communicate packetized data over an analog link or a digital RF link. MACPHY/P2S are transported on an individual IQ stream that is generated by a modem. The IQ streams (including the MACPHY/P2S stream) are modulated to a carrier frequency, and in the case of digital RF transport digitally converted.

Figure 6:
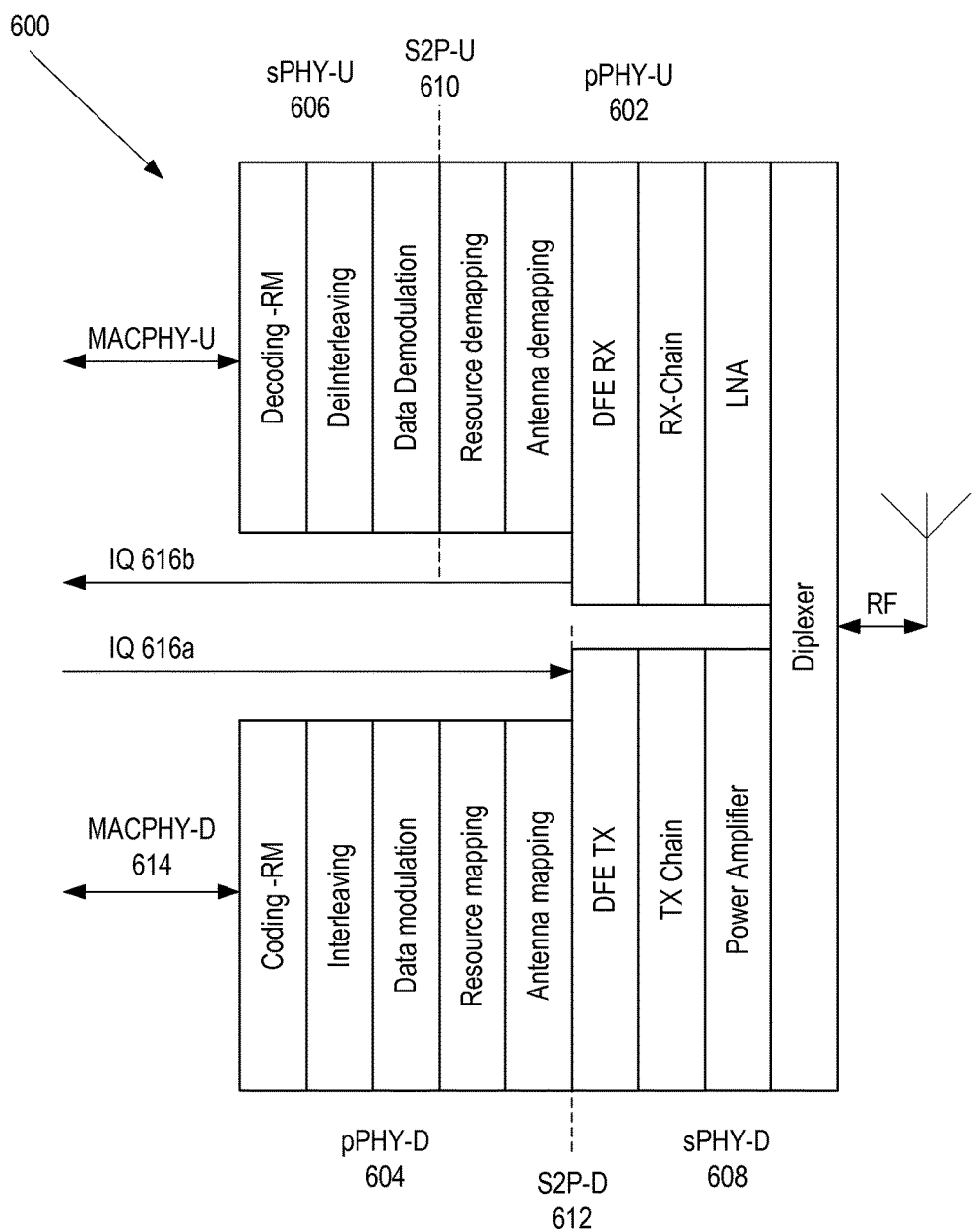
FIG. 6 is a block diagram depicting an example of a PHY layer with a split between uplink and downlink processing and a split between secondary and primary processing for signals in a telecommunication system according to one aspect of the present disclosure.

FIG. 6 is a block diagram of a PHY layer 600 that shows one example of a split between the PHY layer modules described in FIG. 5. This example includes a split between uplink and downlink processing and a split between secondary and primary processing. FIG. 6 depicts an example for a single carrier PHY with single-in-single-out ("SISO") (e.g., one antenna) for a particular assignment of the stages to PHY entities. The PHY entities can handle multiple carriers and serve multiple antennas in a multiple-in-multiple-out ("MIMO") configuration. Depending on the implementation, different processing stages can be assigned to the pPHY-U 602, pPHY-D 604, sPHY-U 606, and sPHY-D 608 entities. For example, the splits S2P-U 610 and S2P-D 612 between the PHY entities can communicate different types of information depending on the assignment.

MACPHY-D 614 can include information to be transmitted that is processed by pPHY-D 604 functions and the sPHY-D 608 functions, which can include a transmit chain ("TX-chain") that can implement low power signal processes. The IQ data 616a representing carrier information can be received from the digital frontend transmit ("DFE-TX") block and IQ data 616b representing carrier information can be transmitted by the digital frontend receive ("DFE-RX") block. The split between primary and secondary physical layer functionalities can be selected by an installer, system provider, or manager, depending on the component in which certain functions are to be performed in the system.

Combined SeNB and Distributed PHY Layer Functionality

In some aspects, the distributed PHY layer functionality depicted in FIGS. 5 and 6 can be combined with the distributed SeNB functionality depicted in one or more of FIGS. 2-4. For example, one or more of the low-layer processing modules 214a-d, 300, or 400 depicted in FIGS. 2-4 can implement one or more of the pPHY-U, pPHY-D, sPHY-U, or sPHY-D functions depicted in FIGS. 5 and 6 in addition to the SeNB functionality described herein.

Figure 7:
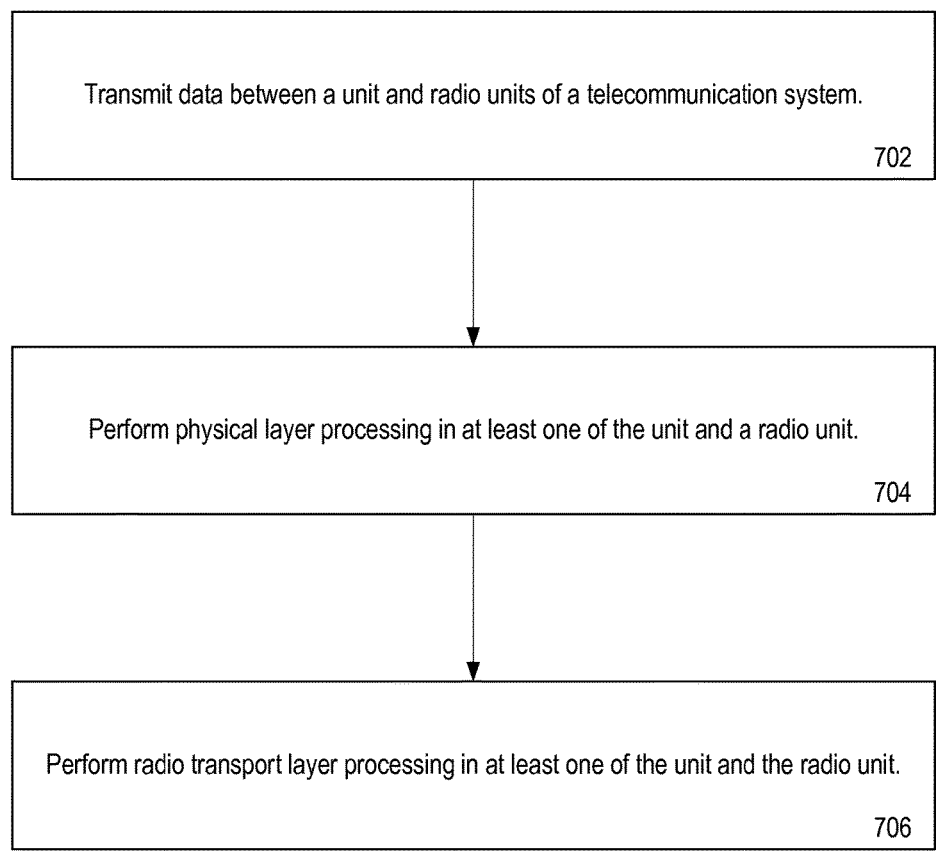
FIG. 7 is a flow chart depicting an example of a process for distributing base station functionality in a telecommunication system according to one aspect of the present disclosure.

FIG. 7 is a flow chart depicting an example of a process for distributing base station functionality in a telecommunication system (e.g., a DAS, repeater, or radio access network).

In block 702, data is transmitted between a unit and radio units of a telecommunication system. The unit may be a head-end unit, an aggregation unit, or another unit of the telecommunication system. One or more units of the telecommunication system may include a low-layer processing module. In some aspects, the low-layer processing module may be integrated into the unit. In additional or alternative aspects, the low-layer processing module may be a plug-in card or other suitable device that can be installed in a component in the telecommunication system.

In block 704, physical layer processing is performed in at least one of the unit and a radio unit. In some aspects, physical layer processing may be split between uplink physical layer processing and downlink physical layer processing. In additional or alternative aspects, the unit and the radio unit may each perform a portion of the processing. For example, the radio unit may perform uplink physical layer processing and the unit may perform downlink physical layer processing.

In some aspects, the uplink physical layer processing can be split between secondary uplink physical layer processing and primary uplink physical layer processing. In additional or alternative aspects, the downlink physical layer processing can be split between secondary downlink physical layer processing and primary downlink physical layer processing. For example, the radio unit may include a low-layer processing module that can perform primary uplink physical layer processing. A head-end unit or other suitable unit in communication with the radio unit may include a low-layer processing module that can perform secondary uplink physical layer processing. In another example, the radio unit may include a low-layer processing module that can perform primary uplink physical layer processing and secondary downlink physical layer processing. A head-end unit or other suitable unit in communication with the radio unit may include a low-layer processing module that can perform secondary uplink physical layer processing and primary downlink physical layer processing.

In block 706, radio transport layer processing is performed in at least one of the unit and a radio unit. In some aspects, the unit may communicate mobile communication signals with the radio unit. In additional or alternative aspects, the unit may communicate mobile communication signals with a base-station entity, base-station component (such as a baseband unit or remote radio head), or core-network entity. The mobile communication signals may include digital RF data, baseband IQ data, X2 data, and S1 data.

Although FIG. 7 depicts both of blocks 704, 706, other implementations are possible. In one example, a telecommunication system (e.g., a DAS, a repeater) may omit block 704 and perform SeNB processing using one or more of the features depicted in FIGS. 2-4. In another example, a telecommunication system (e.g., a DAS, a repeater) may omit block 706 and perform SeNB processing using one or more of the features depicted in FIGS. 5 and 6.

For illustrative purposes, this disclosure includes references to "a SeNB module" and "a MeNB." But any suitable implementation can be covered by the examples described herein, including implementations involving one or more SeNB modules, one or more cells serviced using one or more SeNB modules, one or more SeNBs being implemented using a given SeNB module, one or more LTE cells being implemented using one or more SeNB modules, one or more SeNB modules being used for one or more given providers being serviced, one or more MeNBs in communication with one or more SeNB modules, etc.

The foregoing description, including illustrated examples, has been presented only for the purpose of illustration and description and is not intended to be exhaustive or to limit the subject matter to the precise forms disclosed. Various modifications, adaptations, and uses thereof will be apparent to those skilled in the art without departing from this disclosure's scope. The illustrative examples described above are given to introduce the reader to the general subject matter discussed here and are not intended to limit the scope of the disclosed concepts.

What is claimed is:

1. A telecommunication system that is remotely located from an external base-station entity, base-station component, or core-network entity, the telecommunication system, comprising:
   an interface with circuitry configured to communicate with the external base-station entity, base-station component, or core-network entity;
   a plurality of spatially separated radio units that are communicatively coupled to the interface via an aggregation unit, wherein the radio units are positionable in an area for providing wireless coverage to terminal devices;
   the aggregation unit communicatively coupleable between the interface and the plurality of radio units; and
   a low-layer processing module in at least one of the aggregation unit or a radio unit of the plurality of radio units, the low-layer processing module configured to perform physical layer processing that is split between uplink physical layer processing and downlink physical layer processing.

2. The telecommunication system of claim 1, wherein the uplink physical layer processing is split between secondary uplink physical layer processing and primary uplink physical layer processing, wherein the downlink physical layer processing is split between secondary downlink physical layer processing and primary downlink physical layer processing.

3. The telecommunication system of claim 2, wherein the radio unit of the plurality of radio units includes a first low-layer processing module configured to perform the primary uplink physical layer processing and the downlink physical layer processing, wherein the aggregation unit includes a second low-layer processing module configured to perform the secondary uplink physical layer processing.

4. The telecommunication system of claim 2, wherein a radio unit of the plurality of radio units includes a first low-layer processing module configured for the primary uplink physical layer processing and the secondary downlink physical layer processing, wherein the aggregation unit includes a second low-layer processing module configured for the secondary uplink physical layer processing and the primary downlink physical layer processing.

5. The telecommunication system of claim 2, wherein a radio unit of the plurality of radio units includes a first low-layer processing module configured for the uplink physical layer processing and the secondary downlink physical layer processing, wherein the aggregation unit includes a second low-layer processing module configured for the primary downlink physical layer processing.

6. The telecommunication system of claim 1, wherein the low-layer processing module is a Secondary eNodeB ("SeNB") device and is further configured to perform radio transport layer processing.

7. The telecommunication system of claim 6, wherein the SeNB device is further configured to perform at least one of media access control layer processing, radio link control processing, or packet data convergence protocol processing.

8. The telecommunication system of claim 1, wherein the telecommunication system extends coverage of the base-station entity, base-station component, or core-network entity.

9. The telecommunication system of claim 1, wherein the telecommunication system is at least one of a repeater communicatively coupled to the external base-station entity, base-station component, or core-network entity to form a distributed base station, a radio access network, or a distributed antenna system.

10. The telecommunication system of claim 1, wherein the external base-station entity, base-station component, or core-network entity comprises at least one of a baseband unit, a remote radio head, a master eNodeB, and an entity in a core network.

11. A telecommunication system comprising:
a unit configured for receiving data from an external base-station entity, base-station component, or core-network entity;
a plurality of spatially separated radio units that are communicatively coupled to the external base-station entity, base-station component, or core-network entity via the unit, wherein the radio units are configured for wirelessly communicating RF signals with terminal devices; and
a low-layer processing module communicatively coupled to the unit and at least one radio unit of the plurality of radio units, the low-layer processing module configured for processing the received data for transmission to the terminal devices using a radio transport layer of the protocol.

12. The telecommunication system of claim 11, wherein the low-layer processing module is further configured for processing the received data for transmission to the terminal devices using the physical layer of the protocol, and the processing is split between uplink processing and downlink processing.

13. The telecommunication system of claim 11, wherein the low-layer processing module is a SeNB module integrated into at least one of the unit or a radio unit of the plurality of radio units.

14. The telecommunication system of claim 13, wherein the SeNB module is configured to implement low-level protocols including radio link control and media access control.

15. The telecommunication system of claim 11, wherein the unit is configured to communicate mobile communication signals with the plurality of radio units, the mobile communication signals comprising at least two types of data, wherein the two types of data comprise digital RF data, baseband IQ data, X2 data, and S1 data.

16. The telecommunication system of claim 11, wherein the unit is configured to communicate mobile communication signals with the external base-station entity, base-station component, or core-network entity, the mobile communication signals comprising at least two types of data, wherein the types of data comprise IQ data, X2 data, and S1 data.

17. The telecommunication system of claim 11, wherein the telecommunication system is at least one of a repeater communicatively coupled to the external base-station entity, base-station component, or core-network entity to form a distributed base station, a radio access network, or a distributed antenna system.

18. The telecommunication system of claim 11, wherein the external base-station entity, base-station component, or core-network entity comprises at least one of a baseband unit, a remote radio head, a master eNodeB, and an entity in a core network.

19. A method comprising:
transmitting data between a head-end unit and a plurality of spatially separated radio units that are communicatively coupled to the head-end unit via an aggregation unit in a telecommunication system, wherein the head-end unit is coupled to an external base-station entity, base-station component, or core-network entity, wherein the plurality of radio units wirelessly communicate with terminal devices, and wherein the telecommunication system extends coverage of the external base-station entity, base-station component, or core-network entity; and
performing SeNB functions in at least one of the head-end unit or a radio unit of the plurality of radio units.

20. The method of claim 19, wherein SeNB functions include radio transport layer processing.

21. The method of claim 19, further comprising performing distributed physical layer processing in at least one of the head-end unit or the radio unit.

22. The method of claim 21, wherein the distributed physical layer processing is performed by splitting the distributed physical layer processing between uplink physical layer processing and downlink physical layer processing, and wherein the head-end unit and the radio unit each perform a portion of the processing.

23. The method of claim 19, wherein the telecommunication system is at least one of a repeater, a radio access network, or a distributed antenna system.

24. The method of claim 19, wherein the external base-station entity, base-station component, or core-network entity comprises at least one of a baseband unit, a remote radio head, a master eNodeB, and an entity in a core network.

25. A method comprising:
  transmitting data between a head-end unit and a plurality of spatially separated radio units that are communicatively coupled to the head-end unit via an aggregation unit in a telecommunication system, wherein the head-end unit is coupled to a base-station entity, base-station component, or core-network entity, wherein the telecommunication system extends coverage of the base-station entity, base-station component, or core-network entity; and
  performing distributed physical layer processing in at least one of the head-end unit or a radio unit of the plurality of radio units.

26. The method of claim 25, further comprising performing SeNB functions in at least one of the head-end unit or the radio unit.

27. The method of claim 26, wherein the SeNB functions include radio transport layer processing.

28. The method of claim 25, wherein the distributed physical layer processing is performed by splitting the distributed physical layer processing between uplink physical layer processing and downlink physical layer processing, and wherein the head-end unit and the radio unit each perform a portion of the processing.

29. The method of claim 25, wherein the telecommunication system is at least one of a repeater, a radio access network, and a distributed antenna system.

30. The method of claim 25, wherein the external base-station entity, base-station component, or core-network entity comprises at least one of a baseband unit, a remote radio head, a master eNodeB, and an entity in a core network.

* * * * *